United States Patent [19]

Kückens et al.

[11] Patent Number: 4,675,165

[45] Date of Patent: Jun. 23, 1987

[54] APPARATUS FOR IMPREGNATING WATER WITH $CO_2$ USING A STEPPED CHANNEL WITH MULTIPLE GAS INLETS

[75] Inventors: Alexander Kückens, Gross Sarau; Horst Köhl, Bad Oldesloe, both of Fed. Rep. of Germany

[73] Assignee: Technica Entwicklungsgesellschaft mbH & Co. KG, Ratzeburg, Fed. Rep. of Germany

[21] Appl. No.: 642,031

[22] Filed: Aug. 17, 1984

[30] Foreign Application Priority Data

Aug. 23, 1983 [DE] Fed. Rep. of Germany ....... 3330375
Mar. 22, 1984 [DE] Fed. Rep. of Germany ....... 3410621

[51] Int. Cl.[4] .......................... B01F 3/04; B01F 5/04; A01G 7/02

[52] U.S. Cl. ................................ 422/261; 261/18 R; 261/64 B; 261/DIG. 75; 261/64.3; 261/18.1; 47/48.5

[58] Field of Search ..................... 261/18 R, 62, 64 B, 261/76, DIG. 75; 47/62, DIG. 4, 48.5; 422/261; 239/427.5

[56] References Cited

U.S. PATENT DOCUMENTS

| | | | |
|---|---|---|---|
| 1,195,044 | 8/1916 | Lockwood | 261/18 R |
| 1,491,057 | 4/1924 | Myers | 261/DIG. 75 |
| 2,241,018 | 5/1941 | Lloyd | 261/59 |
| 2,852,239 | 9/1958 | Vicard | 261/76 |
| 3,938,738 | 12/1976 | Nagel et al. | 261/DIG. 75 |
| 4,133,655 | 1/1979 | De Cardenas | 261/DIG. 56 |
| 4,518,543 | 5/1985 | Dorsch | 261/64 B |

FOREIGN PATENT DOCUMENTS

| | | | |
|---|---|---|---|
| 1192598 | 5/1965 | Fed. Rep. of Germany . | |
| 800069 | 6/1936 | France | 261/18 R |
| 545186 | 6/1956 | Italy | 261/76 |
| 387191 | 2/1973 | U.S.S.R. | 261/DIG. 75 |

OTHER PUBLICATIONS

German journal "Der Spiegel", No. 47/1982, pp. 99 to 101.

*Primary Examiner*—David L. Lacey
*Attorney, Agent, or Firm*—Karl F. Ross; Herbert Dubno

[57] ABSTRACT

An apparatus for impregnating water with carbon dioxide provides a stepped-flow channel with radial shoulders lying in planes perpendicular to the axis of the flow channel creating a zone of increased flow velocity downstream of each shoulder. Radial bores open into each stepped section adjacent the respective shoulder and communicate with a chamber surrounding the flow channel to supply the carbon dioxide to the liquid which is permitted to fill the flow channel and flow freely into an inlet section.

12 Claims, 3 Drawing Figures

APPARATUS FOR IMPREGNATING WATER WITH $CO_2$ USING A STEPPED CHANNEL WITH MULTIPLE GAS INLETS

FIELD OF THE INVENTION

This invention relates to an apparatus for impregnating a liquid, more specifically water, with a gas, particularly $CO_2$, by injector action, in particular for producing irrigation water for use in horticultural businesses, households, for hobby gardeners or the like.

BACKGROUND OF THE INVENTION

Various types of methods and apparatuses have been known in the art to mix, for example, water with carbon dioxide gas and to impregnate water with the gas, (cf., for example, DE-AS 11 92 598, U.S. Pat. No. 2,241,018 or United Kingdom patent specification 13 71 466). Furthermore, it is known to mix gas and water in a mixing nozzle (cf. United Kingdom patent specification 12 74 363).

All methods known in the art have the disadvantage that the degree of impregnation is relatively low, that the gas passes through the water in the form of relatively large bubbles (nevertheless these bubbles are understood to be very small, however, still relatively large when an optimum fine impregnation is intended to be achieved) or that the effort of impregnation by cooling or very high pressures, for example, is relatively great.

Relatively large bubbles present in the impregnated liquid easily result in a separation of gas and water, obstruct the reliable function of dosing devices or clog capillaries in drip irrigation systems or the like. If the degree of impregnation is not sufficiently high, a relatively large quantity of gas is released from the liquid owing to a decrease of pressure at the liquid outlets.

It is known that the health of plants, their growth and their resistance to infestation can substantially be improved when the plants are watered with a liquid containing a large amount of carbon dioxide ($CO_2$) and a correspondingly large amount of carbonic acid ($H_2CO_3$), with the essential point that the arable land itself is watered with a liquid containing a large amount of these substances. For this purpose, adequate devices have been developed for horticultural businesses, outdoor cultivations and re-afforesting areas (cf. German journal "Der Spiegel". No. 47/1982, pages 99 to 101).

Furthermore, watering and fertilizing systems are known for household purposes and hobby gardeners with the aid of which plants or patches of plants can be supplied to the extent required with irrigation water and fertilizers for a longer period of time.

OBJECTS OF THE INVENTION

It is thus an object of the invention to provide an apparatus in which the indicated disadvantages are reliably avoided and wherein a reliable fine impregnation of the liquid free of any coarser gas portions is guaranteed, with the liquid being enriched with gas in an optimum manner.

It is another object of the invention to provide an apparatus with the aid of which any amount of irrigation water discharged from the normal supply system is simply and economically available for the housewife or the hobby gardener, if desired, the irrigation water being enriched and mixed with carbon dioxide and carbonic acid in an optimum manner and, if desired, fertilizers.

SUMMARY OF THE INVENTION

These objects are attained, in accordance with the invention in an apparatus for impregnating a liquid with a gas by injector action wherein the liquid is advanced through an injector nozzle system including at least two gas injector stages and the flow rate of the liquid is gradually varied such that the rate of flow is abruptly reduced at each transition between the injector stages arranged in the direction of flow. The areas of abrupt reduction of the rate of flow are brought into direct contact with a zone containing the carbon dioxide gas.

After having passed through at least two gas injector stages, the liquid can be advanced through at least one further injector stage in such a manner that the liquid impregnated with gas mixes with a further liquid already impregnated with gas by reconversion. The liquid can be advanced through the injector nozzle system in the form of an annular stream can be directly supplied to the outlet for the impregnated liquid. Alternatively, the liquid stream is supplied, below the liquid level, to a stored amount of impregnated liquid from which the impregnated liquid is supplied to one or more outlets.

According to a further aspect of this invention, liquids to fertilize and water plants for household purposes or hobby gardening is prepared by impregnating irrigation water with carbon-dioxide gas. Here the water is drawn from a common water supply system at the temperature in the system and at a system pressure of 1 to 7 bar, and the water is used first to control the feeding of carbon dioxide from a pressure source to at least one contact zone for the water, the water is then supplied to a contact zone in which the pressure is abruptly decreased with respect to the pressure at which the water has been drawn from the water supply system and simultaneously therewith the water is contacted with carbon-dioxide gas.

Basically, the method is carried out with an injector nozzle including at least two injector stages of stepped diameter which are arranged in succession in equiaxial relationship, which are connected with the liquid feeding branch in axial direction and which are designed so that clear widths thereof follow in a step-like manner in a direction of flow, with each area directly behind each diameter stage being in direct contact with the gas pressure source.

An extremely good fine impregnation is attained by these measures without the cooling of the liquid or the application of high pressures being required and with the special advantage that any amount of fine impregnated liquid required can be produced at any moment required. Because of the repeated sudden reduction of the flow rate of the liquid, the amount of gas received in the contact zone is quickly and intensively distributed over the cross section of flow and homogenized by the momentary decrease of both static pressure and flow rate and gas absorptiveness of the liquid in the subsequently arranged injector stages is improved. Fine impregnation and homogeneous blending are improved if the gas injector stages are followed by further injector stages in which a reconversion of the liquid already impregnated is forced within the stream.

These new features advantageously serve to fine impregnate water with $CO_2$ above all for watering and fertilizing purposes.

The impregnated liquid can be directly supplied to an outlet. A pressure reservoir may be provided, however, in case impregnated liquid is intended to be stored.

It is now possible to connect the apparatus with the common water supply system such that the device can be actuated or switched off by merely turning the common faucet on or off. All further inner functions of the apparatus are automatically caused by the pressure in the supply system, which can largely vary without impairing apparatus function and reliability. Such an assembly is particularly suitable for hobby gardeners or household purposes since the assembly is simple and reliable and easy to operate.

In stallation of the apparatus is also extraordinarily simple. The apparatus may, if desired, also serve to add any amount of fertilizer required, and any composition thereof to the irrigation water, with the water being simultaneously finely impregnated without requiring special attention of the operator.

Irrigation water thus provided improves growth, readiness to flower, yield and resistance of the plants to pests or infestation to an extraordinary extent.

Owing to the direct and automatic pressure control, water pressure in the supply system can vary widely, for example, between 1 bar and 7 bar, since the pressure required to supply gas is automatically adjusted by the pressure in the water supply system. The same applies to the control of the fertilizer supply.

While maintaining ease of operation, an accurate, reliable and automatic control of the production of fertilizer-irrigation water is thus obtained on the spot.

BRIEF DESCRIPTION OF THE DRAWING

The present invention will be described in more detail in conjunction with several embodiments and with reference to schematic drawings, in which.

SPECIFIC DESCRIPTION

The basic apparatus is hereinafter first described in conjunction with FIG. 3.

Figure 3:
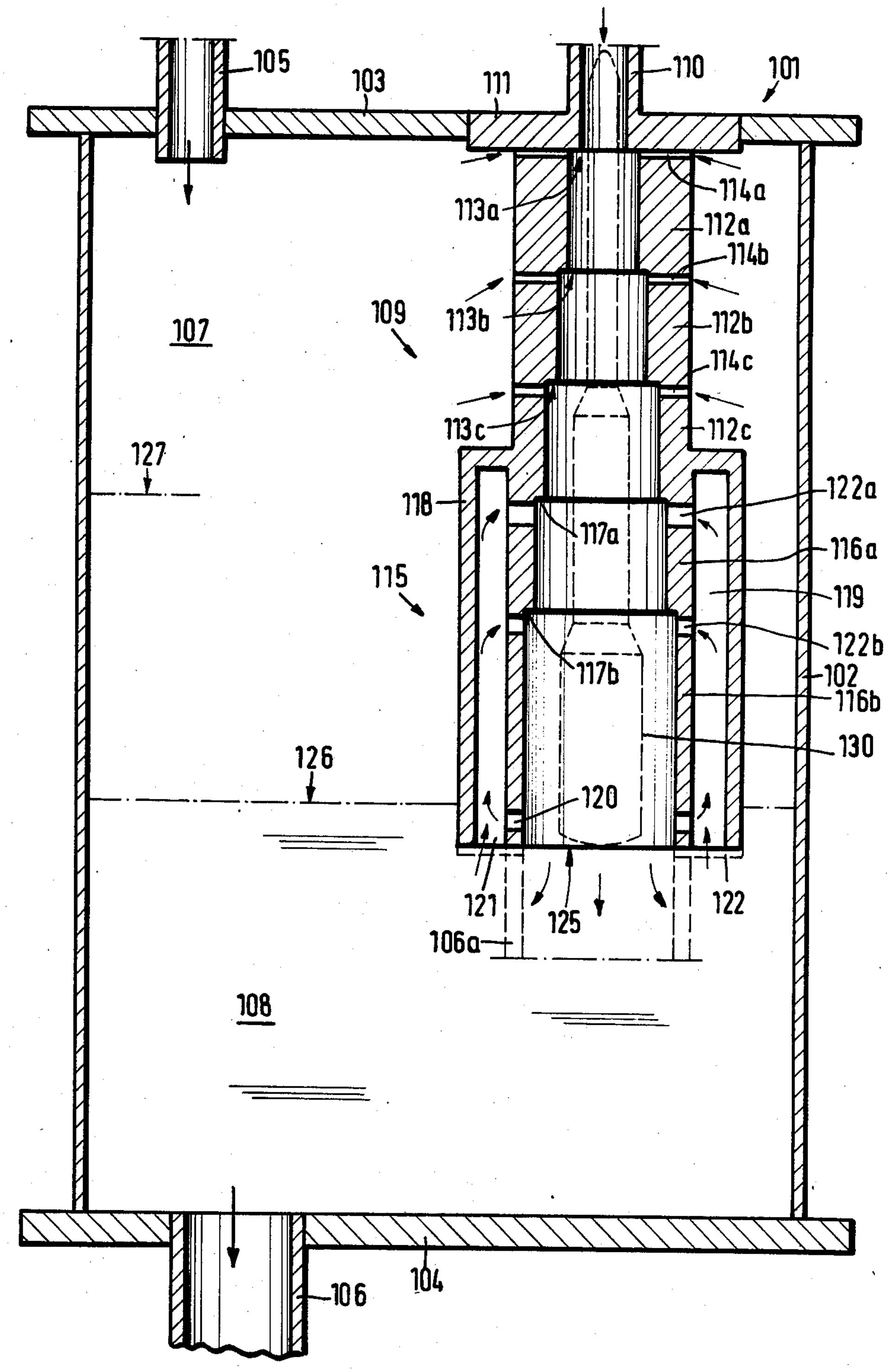
FIG. 3 shows the basic apparatus according to the invention for impregnating a liquid with gas.

Apparatus 101 depicted in FIG. 3 comprises a pressure vessel 102, a cover 103 and a bottom 104. A quantity of liquid 108 is maintained between the minimum liquid level 126 and the maximum liquid level 127 by probes which have not been shown. A gas chamber 107 remaining above the liquid is in communication with a gas source, preferably a source of carbon dioxide gas, through a conduit 105; said gas is held below a predetermined pressure of, for example, up to 5 bar. Supply of gas is controlled, for example, by a pressure transducer. A discharge port 106 for the impregnated liquid is provided in bottom 104. Opposite to said discharge port, however, laterally displaced, there is disposed an injector nozzle system 109 sealingly connected with cover 103 through flange 111. System 109 has a central passage, the inlet of which is connected with a pressurized water source through branch 110.

Three injector stages or steps **112*a* to 112*c* are subsequently arranged in the direction of the flow. Directly in front of each injector stage, clear width of the passage is extended in a step-like manner at points 113*a* to 113*c*. Flow rate and liquid pressure thus abruptly change directly when the liquid passes an extended section. Connections or intake channels 114*a* to 114*c* opening into gas chamber 107 are located upstream of and adjacent respective steps or shoulders 113*a* to 113*c*. Upon operation gas is taken up into the liquid stream through channels 114*a*, 114*b*, 114*c***. Owing to the arrangement, the gas chiefly present in the outer layers of the liquid first, is quickly added to the liquid by blending of all layers of the cross section of flow and is homogeneously distributed in the stream thus favoring re-intake of gas in the subsequent impregnation stage. At least two such injector stages are necessary to achieve the fine impregnation required.

To further stabilize the gas/liquid mixture and to avoid possible larger bubbles, system 109 is followed in axial direction by an additional system 115. In the example shown, said system 115 has two stages **116*a*, 116*b* wherein the clear width of the liquid stream also abruptly changes. These stages serve for the reconversion and homogenization of the impregnated liquid. For this purpose, an outer sheathing 118 is provided which is closed towards gas chamber 107 and whose lower open edge terminates below the minimum liquid level 126**.

Impregnated liquid is drawn in through open end 121 and through an outlet port 120 of the passage, respectively, which is located at about the same height by the drawing action of stages **116*a*, 116*b* and is supplied back to the liquid stream in opposite direction thereof and is added to the stream. Outlet 125 of system 115 is also located below the lowest liquid level 126. Because of the lateral offset of outlet 125 and discharge port 106 possible larger bubbles have sufficient time to rise through the liquid 108 into gas head in chamber 107**.

If a liquid, in particular water, is supplied to intake 110, liquid level rises and gas head chamber 107 decreases in volume. Depending on the conditions, supply conduit 105 is either turned off when the pressure in gas chamber 107 increases or, when a sufficient amount of gas has been drawn from the head chamber, more gas is supplied thereto. The pressure in head chamber 107 is held at a value that corresponds to the water pressure, for example, at a pressure of 5 bar.

Injector systems 109, 115 can be also used for directly dispensing the liquid. In this case, no pressure reservoir is required; system 109 is then encircled by a sheathing so as to form a gas chamber connected with the compressed gas source and sheathing 118 of system 115 is closed at 122, while the passage extends beyond outlet 125 to the consumption or draw point, as is indicated by the lengthened line **106*a***.

Large quantities of liquid passing through the system require correspondingly large cross sections of flow. It is advantageous in this case to provide in the passage a displacement member 130 of an either uniformly or gradually increasing diameter.

Operation of the apparatus described is reliable at a pressure ranging between 1 bar and 6 bar and higher both in case impregnated liquid is directly drawn and, as depicted hereinbefore, in case the liquid is indirectly drawn. Consequently, the assembly is particularly suited to impregnating water with $CO_2$ for horticultural businesses, since the apparatus can be employed in all pressure conditions occurring in this field.

Figure 1:
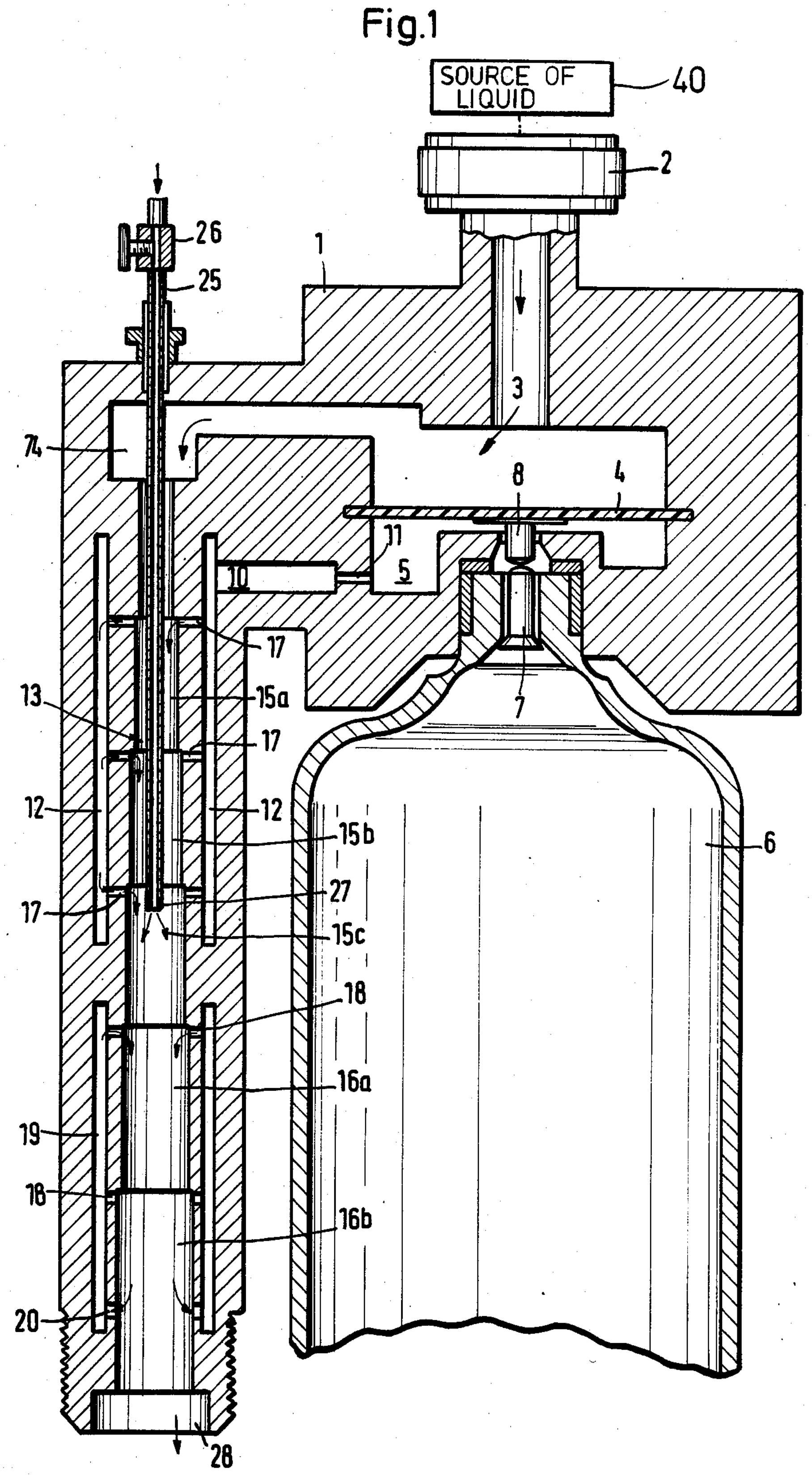
FIG. 1 shows, in vertical section, a first embodiment of the apparatus according to the invention.
Figure 2:
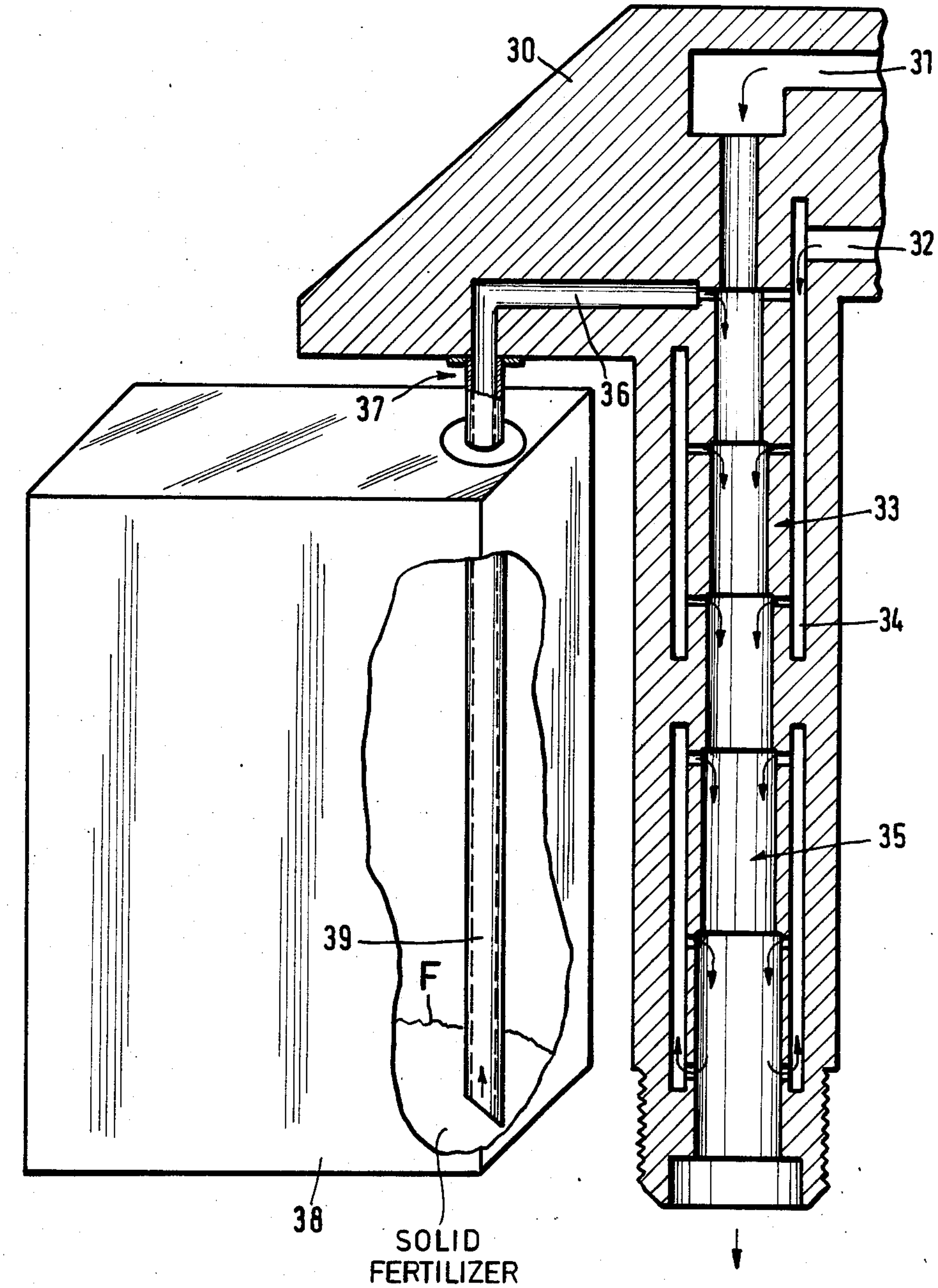
FIG. 2 represents in a manner similar to FIG. 1, however in a detail, a modified embodiment.

The apparatus represented in FIG. 1 and the apparatus in FIG. 2 are particularly suitable for supplying household or hobby gardeners in a simple, comfortable and economic manner with fertilizer-irrigation water.

In the embodiment depicted in FIG. 1 apparatus block 1 has a connection 2 for a common water supply system equipped with a faucet or a source of liquid under pressure 40. A control chamber 3 in communication with connection 2 is disposed in apparatus block 1. Water entrance pressure corresponds to the respective pressure in the supply system and may vary to a large extent, for example, between 1 bar and 7 bar. The same applies to the temperature of the water. The water pressure in control chamber 3 acts on a diaphragm 4 which engages movable member 7 of the reducing valve of a $CO_2$-pressure reservoir 6 through plunger 8, a conventional pressure gas cylinder can be employed in this case. Reservoir 6 equipped with a valve is sealingly screwed on the standard connection provided at apparatus block 1. The valve automatically shuts as long as no outer control pressure acts on the valve member 7.

Diaphragm 4 seals a gas distribution chamber 5 located below, which is in communication with a gas chamber 10 through throttle means 11. Furthermore, a flow channel 13 is provided in the apparatus block, the inlet side 14 of which is in free flow communication with control chamber 3. Flow channel 13 is preferably straight-lined and long and terminates at a lower outlet 28 which may serve for filling sprinkling cans or the like with water or for connecting garden hoses or the like.

As the basic apparatus according to FIG. 3, channel 13 has a plurality of sections **15*a* to 15*c* of abruptly or gradually extending clear widths. Directly behind the shoulder-like, abrupt extended portions, there are provided openings 17 towards distribution passages 12, which are in communication with gas chamber 10. Gas impregnation sections 15*a* to 15*c* are followed by reconversion sections 16*a*, 16*b* of also abruptly extending diameters which are in free reconversion communication with connecting channels 19 through bores 18. Therefore, the lower ends of channels 19 are connected with flow channel 13 through bores 20**.

From top, a feed pipe 25 projects into flow channel 13 at a radial distance, said feed pipe is in communication with a fertilizer store for liquid fertilizer through metering valve 26 and terminates in the area of one of said extended sections **15*a* to 15*c***.

If irrigation water is required, the faucet of the supply system is turned on. Water is poured into control chamber 3, with the respective water pressure acting on diaphragm 4. Diaphragm 4 is designed and dimensioned such that the reducing valve 7 of pressure reservoir 6 is correspondingly opened as early as the pressure reaches 1 bar so that $CO_2$ can flow into chamber 5 at a pressure reduced according to the water pressure. Throttle means 11 provides that the flowing-off gas does not reach flow channel 13 until this channel has been filled with water from control chamber 3.

The water is fine impregnated in flow channel 13 as depicted in detail in conjunction with the apparatus according to FIG. 3. After the fine impregnation process, dosed amounts of fertilizer are added to the water in flow channel 13 and mixed with the stream. Stages **16*a* and 16*b* substantially favor fine impregnation and homogeneous blending. Entrance cross section of the fertilizer can be adjusted at valve 26. The pressure at which the fertilizer is supplied can be directly or indirectly determined by the pressure in control chamber 3. Instead of such a control, the pressure in chamber 5 controlled by chamber 3** can also be caused to act on a flexible reservoir containing the fertilizer. Turning on of the faucet automatically causes pressure build-up above the liquid fertilizer. Accordingly, pressure decreases when the faucet is turned off. For these control purposes water pressure can be also directly used instead of gas pressure.

FIG. 2 illustrates that the vacuum at the individual stages in the flow channel can be used for intake of the fertilizer. One of the injector stages 33 is connected with riser 39 of a fertilizer reservoir 38 through suction pipe 36. Riser 39 can be connected to the block at 37. Gas intake takes place through gas chamber 32 and distribution line 34. In this case, too, an impregnation means 33 is followed by a reconversion means 35.

An additional injector stage used for intake of the liquid fertilizer only may also be provided, though. Intake action according to FIG. 2 can also be applied in combination with the pressure responsiveness of the fertilizer store. A solid fertilizer F quickly soluble in water may also be employed. In this case, the apparatus block is designed such that the water flowing through channel 13 according to FIG. 1 floods the solid fertilizer, and thus an adequate quantity of fertilizer is dissolved.

Valve 7 is a simple shut-off valve controlled by diaphragm 4 in the sense of a pressure reducing valve. Internal pressure of such a reservoir 6 amounts to, for example, 60 bar and may moreover, fluctuate depending on the temperature. Surface ratio of the sealing surface of valve 7 and the surface of the diaphragm is about 1:60. Hence, the reservoir shuts off at an atmospheric pressure in the apparatus. In case of water pressure in chamber 3, said pressure is transmitted, so as to increase 60 times, by the diaphragm so that valve 7 correspondingly opens even if water pressure is low and supplies gas to chamber 5 at the corresponding pressure. Unlike a usual compression-spring controlled reducing valve, gas discharge is controlled in the assembly described in accurate response to water pressure and its fluctuations.

To prevent larger bubbles from flowing away in the water stream and escaping to the atmosphere unused, a coiled or a meander-like system can be provided in the apparatus block which is vertically arranged in the system shown, with the topmost point opening into the gas chamber. At this point, outlet ports may be provided which let the lighter gas escape into the gas chamber at the topmost point.

In usual impregnating methods there occur losses of gas, not only because of greater gas bubbles but particularly in view of the release of gas during decompression at the borrow or consumption point. In the new method such losses are avoided. Even though the gas pressure is low, an intensive impregnation of the water is effected at those points in which the velocity of flow is momentarily reduced to almost zero and the power of velocity is reduced partially. At these points the relatively low gas power becomes effective as surplus pressure. The losses of decompression are thus extremely low and the stability of the impregnating status extremely great. Only for that reason it becomes possible to apply the method and device on plants for decoration and commercial purposes in all fields of application.

We claim:

1. An apparatus for impregnating a liquid with a gas, comprising:

means forming a linearly elongated flow channel with a longitudinal axis, said linearly elongated flow channel having:

an inlet section at one axial end of said flow channel in free-flow communication over substantially its entire flow cross section with a source delivering a liquid under pressure, at least one further section axially connected to and following said inlet section in an axial flow direction, and an outlet section connected to and following said at least one further section for discharging liquid delivered to said inlet section, all of said sections being of substantially uniform cross section throughout the lengths thereof and having an inlet end and an outlet end;

a respective small annular shoulder connecting said outlet end of each of said sections but said outlet section to said inlet end of the axially next following section, each of said small annular shoulders extending radially outwardly from the respective outlet end and lying in a plane perpendicular to said axis to form an abrupt increase in the cross section of said flow channel at which the velocity of flow of the liquid momentarily increases in a zone of increased flow velocity adjacent the respective shoulder; and means for introducing gas into said flow channel for impregnation into the liquid, said means for introducing the gas into said flow channel comprising:

a plurality of passages for the gas distributed around each of said shoulders and opening at one end of each of said passages into the respective one of said zones of increased flow velocity at a respective small-diameter radial bore and at an opposite end of each of said passages into an annular gas distributing chamber, and means for supplying gas under pressure to said chamber, whereby the gas will be drawn into the liquid which flows in said flow channel through said passages by a pressure drop of liquid in said zones of increased flow velocity adjacent each of said shoulders.

2. The apparatus defined in claim 1 wherein said source is a source of water at a pressure between 1 bar and 7 bar, said means for supplying gas is a source of carbon dioxide at a pressure below that of the water, said shoulders and the respective bores being so positioned that the abrupt flow cross section change immediately beyond each of said shoulders is sufficient to enable gas from said chamber to pass through said bores in spite of the pressure of the water being higher than that of the gas.

3. The apparatus defind in claim 2, further comprising:

an additional section of said flow channel axially connected to said outlet section, said additional section having an inlet end and an outlet end;

means forming an annular compartment surrounding said additional section;

an additional annular shoulder lying in a plane perpendicular to said axis connecting said outlet end of said outlet section with said inlet end of said additional section to create a further zone of increased flow velocity adjacent said additional shoulder;

radial bores positioned in said inlet end and opening adjacent said additional annular shoulder interconnecting said annular compartment with said further zone to induce a flow of liquid from said chamber into said further zone; and radial bores positioned in said outlet end and opening from said chamber into said additional section beyond said radial bores, in said inlet end for drawing liquid from said additional section into said chamber.

4. The apparatus defined in claim 2, further comprising:

a central displacement member extending through said sections with all-around clearance so as to impart an annular shape to said flow channel.

5. An apparatus for impregnating a liquid with a gas, comprising:

means forming a linearly elongated flow channel with a longitudinal axis, said linearly elongated flow channel having:

an inlet section at one axial end of said flow channel in free-flow communication over substantially its entire flow cross section with a source delivering a liquid in the form of water under a pressure of 1 to 7 bar, at least one further section axially connected to and following said inlet section in an axial flow direction, and an outlet section connected to and following said at least one further section for discharging liquid delivered to said inlet section, all of said sections being of substantially uniform cross section throughout the lengths thereof and having an inlet end and an outlet end;

a respective small annular shoulder connecting said outlet end of each of said sections but said outlet section to said inlet end of the axially next following section, each of said small annular shoulders extending radially outwardly from the respective outlet end and lying in a plane perpendicular to said axis to form an abrupt increase in the cross section of said flow channel at which the velocity of flow of the liquid momentarily increases in a zone of increased flow velocity adjacent the respective shoulder;

means for introducing gas into said flow channel for impregnation into the liquid, said means for introducing the gas into said flow channel comprising:

a plurality of passages for the gas distributed around each of said shoulders and opening at one end of each of said passages into the respective one of said zones of increased flow velocity at a respective small-diameter radial bore and at an opposite end of each of said passages into an annular gas distributing chamber, and means for supplying gas under pressure to said chamber, whereby the gas will be drawn into the liquid which flows in said flow channel through said passages by a pressure drop of liquid in said zones of increased flow velocity adjacent each said shoulder, said shoulders and the respective bores being so positioned that the abrupt flow cross section change immediately beyond each of said shoulders is sufficient to enable gas from said chamber to pass through said bores in spite of the pressure of the water being higher than that of the gas; and a tank containing a liquid, said means forming said flow channel extending downwardly into the liquid in said tank through a gas head located above a level of the liquid in said tank, said gas head defining said chamber and communicating with said sections through said radial bores.

6. The apparatus defined in claim 5 wherein said tank comprises an outlet offset from said axis.

7. An apparatus for impregnating a liquid with a gas, comprising:

means forming a linearly elongated flow channel with a longitudinal axis, said linearly elongated flow channel having:

an inlet section at one axial end of said flow channel in free-flow communication over substantially its entire flow cross section with a source delivering 9 liquid in the form of water under a pressure of 1 to 7 bar, at least one further section axially connected to and following said inlet section in an axial flow direction, and an outlet section connected and following said at least one further section for discharging liquid delivered to said inlet section, all of said sections being of substantially uniform cross section throughout the lengths thereof and having an inlet end and an outlet end;

a respective small annular shoulder connecting said outlet end of each of said sections but said outlet section to said inlet end of the axially next following section, each of said small annular shoulders extending radially outwardly from the respective outlet end and lying in a plane perpendicular to said axis to form an abrupt increase in the cross section of said flow channel at which the velocity of flow of the liquid momentarily increases in a zone of increased flow velocity adjacent the respective shoulder;

means for introducing gas into said flow channel for impregnation into the liquid, said means for introducing the gas into said flow channel comprising:

a plurality of passages for the gas distributed around each of said shoulders and opening at one end of each of said passages into the respective one of said zones of increased flow velocity at a respective small-diameter radial bore and at an opposite end of each of said passages into an annular gas distributing chamber, and means for supplying gas under pressure to said chamber, whereby the gas will be drawn into the liquid which flows in said flow channel through said passages by a pressure drop of liquid in said zones of increased flow velocity adjacent each of said shoulders, said shoulders and the respective bores being so positioned that the abrupt flow cross section change immediately beyond each of said shoulders is sufficient to enable gas from said chamber to pass through said bores in spite of the pressure of the water being higher than that of the gas, said means for supplying said gas including a tank having an outlet and containing carbon dioxide under pressure; and a pressure-reducing valve connected with said outlet of said tank and subjected to a pressure of the water so as to control a flow of carbon dioxide to said chamber.

8. The apparatus defined in claim 7, further comprising a compartment communicating with said pressure-reducing valve and throttle means connecting said compartment with said chamber for preventing gas from said tank from reaching said compartment until said sections are all filled with water.

9. The apparatus defined in claim 7 wherein said valve comprises a diaphragm positioned and arranged to define a control chamber in flow communication with said source delivering the liquid and with said inlet section.

10. An apparatus for impregnating a liquid with a gas, comprising:

means forming a linearly elongated flow channel with a longitudinal axis, said linearly elongated flow channel having:

an inlet section at one axial end of said flow channel in free-flow communication over substantially its entire flow cross section with a source delivering a liquid in the form of water under a pressure of 1 to 7 bar, at least one further section axially connected to and following said inlet section in an axial flow direction, and an outlet section connected to and following said at least one further section for discharging liquid delivered to said inlet section, all of said sections being of substantially uniform cross section throughout the lengths thereof and having an inlet end and an outlet end;

a respective small annular shoulder connecting said outlet end of each of said sections but said outlet section to said inlet end of the axially next following section, each of said small annular shoulders extending radially outwardly from the respective outlet end and lying in a plane perpendicular to said axis to form an abrupt increase in the cross section of said flow channel at which the velocity of flow of the liquid momentarily increases in a zone of increased flow velocity adjacent the respective shoulder;

means for introducing gas into said flow channel for impregnation into the liquid, said means for introducing the gas into said flow channel comprising:

a plurality of passages for the gas distributed around each of said shoulders and opening at one end of each of said passages into the respective one of said zones of increased flow velocity at a respective small-diameter radial bore and at an opposite end of each of said passages into an annular gas distributing chamber, and means for supplying gas under pressure to said chamber, whereby the gas will be drawn into the liquid which flows in said flow channel through said passages by a pressure drop of liquid in said zones of increased flow velocity adjacent each each of said shoulders, said shoulders and the respective bores being so positioned that the abrupt flow cross section change immediately beyond each of said shoulders is sufficient to enable gas from said chamber to pass through said bores in spite of the pressure of the water being higher than that of the gas; and a fertilizer store connected with said flow channel so as to entrain fertilizer by liquid flowing through said flow channel.

11. The apparatus defined in claim 10 wherein said fertilizer store contains a solid fertilizer.

12. The apparatus defined in claim 10 wherein said fertilizer store contains a liquid fertilizer, and said apparatus comprisingg means communicating said fertilizer store with said flow channel so that the water draws the liquid fertilizer into and through said flow channel.

* * * * *